(12) United States Patent
Nolz et al.

(10) Patent No.: US 9,066,512 B2
(45) Date of Patent: Jun. 30, 2015

(54) COLLAPSIBLE HUNTING BLIND

(75) Inventors: Jason Nicholas Nolz, Manchester, IA (US); Tad Brown, Preston, MO (US); Ronald R. Mears, La Valle, WI (US)

(73) Assignee: Flambeau, Inc., Baraboo, WI (US)

( * ) Notice: Subject to any disclaimer, the term of this patent is extended or adjusted under 35 U.S.C. 154(b) by 91 days.

(21) Appl. No.: 13/554,248

(22) Filed: Jul. 20, 2012

(65) Prior Publication Data
US 2014/0020726 A1 Jan. 23, 2014

(51) Int. Cl.
*A01M 31/02* (2006.01)
*F41A 23/14* (2006.01)
*E04H 15/00* (2006.01)
*E04H 15/44* (2006.01)

(52) U.S. Cl.
CPC .............. *A01M 31/025* (2013.01); *F41A 23/14* (2013.01); *E04H 15/001* (2013.01); *E04H 15/44* (2013.01)

(58) Field of Classification Search
CPC ...... G03B 17/56; G03B 17/561; F41A 23/06; F41A 23/08; F41A 23/12; F41A 23/14; A01M 31/02; A01M 31/025
USPC ........ 135/133, 139, 144, 117, 901, 98; 42/94, 42/90; 248/164, 165, 431; 396/428; 40/603, 604, 610; 160/135, 531, 327, 160/371, 377
See application file for complete search history.

(56) References Cited

U.S. PATENT DOCUMENTS

| | | | | |
|---|---|---|---|---|
| 1,705,052 A * | 3/1929 | Viscount | ........................ | 40/603 |
| 2,725,887 A * | 12/1955 | Belfer | ........................... | 135/147 |
| 2,862,552 A * | 12/1958 | Franz | ........................ | 160/368.1 |
| 3,863,376 A * | 2/1975 | Dalmaso | ........................... | 42/94 |
| 4,506,688 A | 3/1985 | Bethoon et al. | | |
| 4,934,638 A * | 6/1990 | Davis | ............................ | 248/164 |
| 5,317,826 A * | 6/1994 | Underwood | ...................... | 42/94 |
| 5,406,732 A * | 4/1995 | Peterson | ............................ | 42/94 |
| 5,507,111 A * | 4/1996 | Stinson et al. | .................... | 42/94 |
| 5,930,932 A * | 8/1999 | Peterson | ........................... | 42/94 |
| 5,930,933 A * | 8/1999 | Schleicher | ....................... | 42/94 |
| 5,944,041 A | 8/1999 | Kitchens | | |
| 6,086,027 A * | 7/2000 | Klimbacher | ................... | 248/166 |
| 6,296,005 B1 | 10/2001 | Williams et al. | | |
| 6,505,429 B2 * | 1/2003 | Percival | ............................ | 42/94 |
| 6,889,465 B1 * | 5/2005 | Holmes | ............................ | 42/94 |
| 6,904,923 B2 * | 6/2005 | Chai et al. | ................. | 135/88.09 |
| 6,938,863 B2 * | 9/2005 | LaMotte | ....................... | 248/165 |
| 7,275,532 B2 | 10/2007 | Niemackl et al. | | |
| D597,218 S * | 7/2009 | Stewart | ......................... | D25/16 |

(Continued)

OTHER PUBLICATIONS

Product Brochure for Predator Sniper Styx from www.predatorsniperstyx.com.

*Primary Examiner* — Noah Chandler Hawk
(74) *Attorney, Agent, or Firm* — Quarles & Brady LLP

(57) ABSTRACT

A hunting blind includes frame formed by first and second tubular support poles into which first and second rods, respectively, are slideably received. A connector of the frame couples the first and second tubular support poles in a manner that enables those poles to pivot with respect to each other. A brace pole engages the connector. A sheet is attached to each of the first and second support poles and the first and second rods, such as by caps placed onto ends of the support poles and rods. When the rods are extended from the support poles, the sheet is held taut on the frame forming a wall held upright by the brace pole and behind which a hunter can sit. Another embodiment of the hunting blind is formed by connecting two such frames together to form an enclosure for a hunter.

51 Claims, 4 Drawing Sheets

(56) References Cited

U.S. PATENT DOCUMENTS

| | | |
|---|---|---|
| 7,594,514 B2 * | 9/2009 | Fereghetti et al. ............ 135/90 |
| 7,966,757 B2 * | 6/2011 | Hyung-Chul .................. 40/603 |
| 8,051,864 B1 | 11/2011 | Gabrielson et al. |
| 2007/0119441 A1 * | 5/2007 | Niemackl et al. .............. 124/86 |
| 2013/0174826 A1 * | 7/2013 | Faherty .......................... 124/88 |
| 2014/0013645 A1 * | 1/2014 | Sargent ........................... 42/94 |

\* cited by examiner

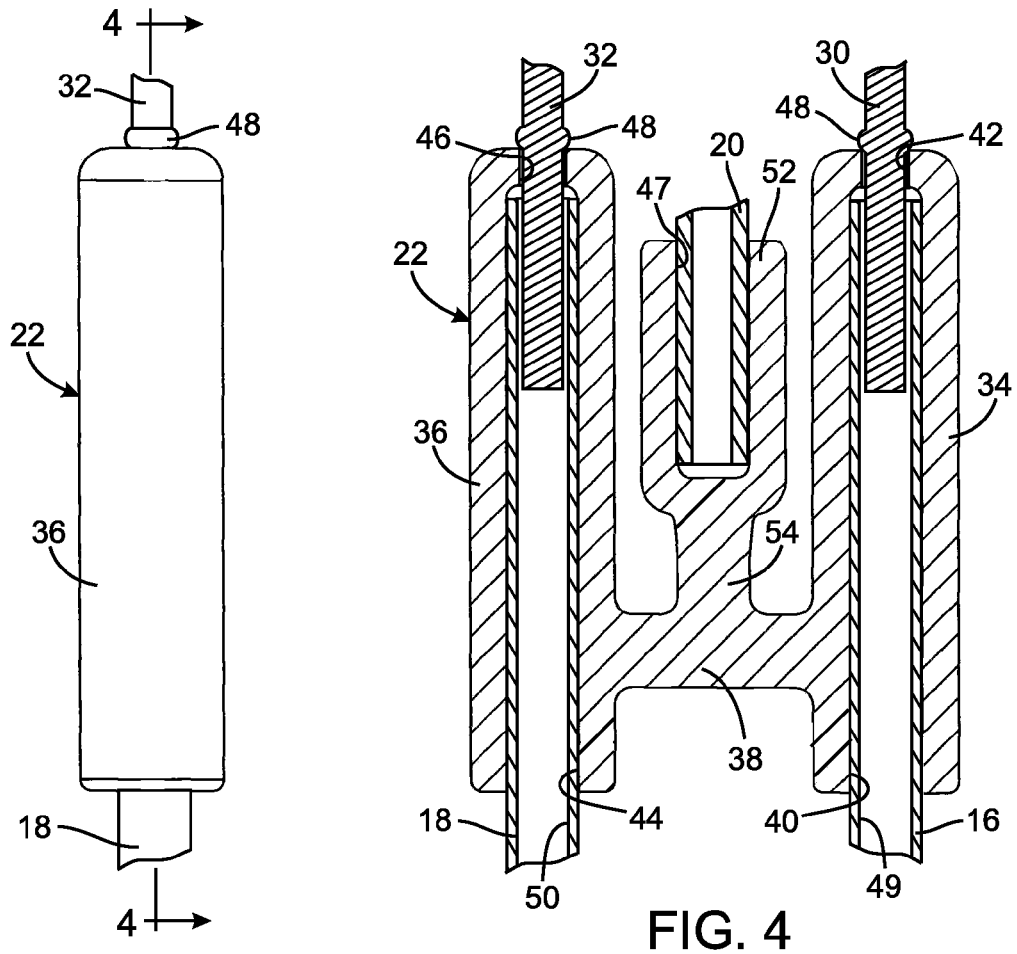
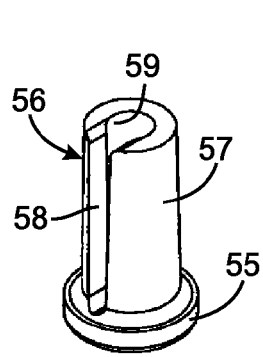
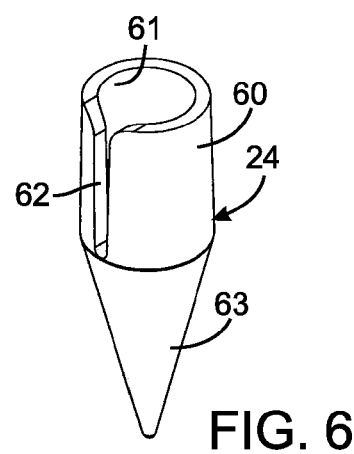

COLLAPSIBLE HUNTING BLIND

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to an apparatus for concealing a hunter, and more particularly, to such apparatus that is collapsible for portability.

2. Description of the Related Art

It is often desirable that a hunter be concealed from the prey. For that purpose, various types of concealment apparatus, often referred to individually as a blind, have been developed. The hunter remains stationary, hidden behind or within the blind while awaiting game, such as deer, turkey, waterfowl or predator animals, to pass nearby.

Some types of blinds are permanent ground structures fabricated out of wood or other materials, often with vegetation placed on the outer surfaces so as to blend in with the landscape. A window or other opening in the blind allows the hunter to observe game and shoot a weapon, such as a gun or bow and arrow, at the game. These permanent structures are frequently located in areas where game is particularly prevalent. These types of structures have the disadvantage of not being moveable to different locations in the hunting area.

Various kinds of portable blinds have been developed that can be moved to different locations within a hunting area and to different widely separated areas. These portable blinds often comprise a group of wood or metal poles that fit together in order to support a tent-like covering under which the hunter sits.

It is particularly desirable that the portable blind be easily collapsed into a compact form that enables the apparatus to be carried by the hunter to the various locations. Once at the location, it is further advantageous that the blind be effortlessly erected and positioned. Therefore, another desirable attribute is that the portable blind be relatively light weight.

SUMMARY OF THE INVENTION

A hunting blind includes first and second support poles, each having a tubular shape, and a brace pole. A connector attaches the first and second support poles and the brace pole in a manner that enables those poles to pivot with respect to each other. The support poles and brace pole are adapted to stand on the ground in a tripod configuration.

A first rod is slideably received within the first support pole and has an end projecting therefrom. A second rod is slideably received within the second support pole and has one end projecting therefrom. A sheet of material is attached to each of the first and second support poles and the first and second rods. Sliding the rods into the support poles collapses the hunting blind for carrying by a hunter. The hunting blind is erected by extending the rods from the support poles.

In one embodiment of the hunting blind, the connector comprises a first receptor for engaging the first support pole and first rod, a second receptor for engaging the second support pole and second rod, and a third receptor for engaging the brace pole. The connector includes a flexible cross member connected to the first, second and third receptors and enabling those receptors to pivot with respect to each other. For example, the first receptor has a first aperture into which the first support pole is received and a second aperture into which the first rod is received; the second receptor has a third aperture into which the second support pole is received and a fourth aperture into which the second rod is received; and the third receptor has a fifth aperture into which the brace pole is received.

Another embodiment of a hunting blind has two frames that support a sheet to form and enclosure. Each frame has first and second tubular support poles into which first and second rods, respectively, are slideably received. A connector attaches the first and second support poles one frame in a manner that enables those poles to pivot with respect to each other. A sheet is coupled to the rods and support poles of the two frames.

BRIEF DESCRIPTION OF THE DRAWINGS

FIG. 3 is a side view of a flexible connector that joins components of the hunting blind together;

FIG. 4 is a cross sectional view of the a flexible connector along line 4-4 in FIG. 3 and illustrating engagement with poles and rods of the hunting blind;

FIG. 5 shows one of the end caps that attach to the rods;

FIG. 6 shows one of the stake caps that are used to embed remote ends of the poles into the ground;

DETAILED DESCRIPTION OF THE INVENTION

Figure 1:
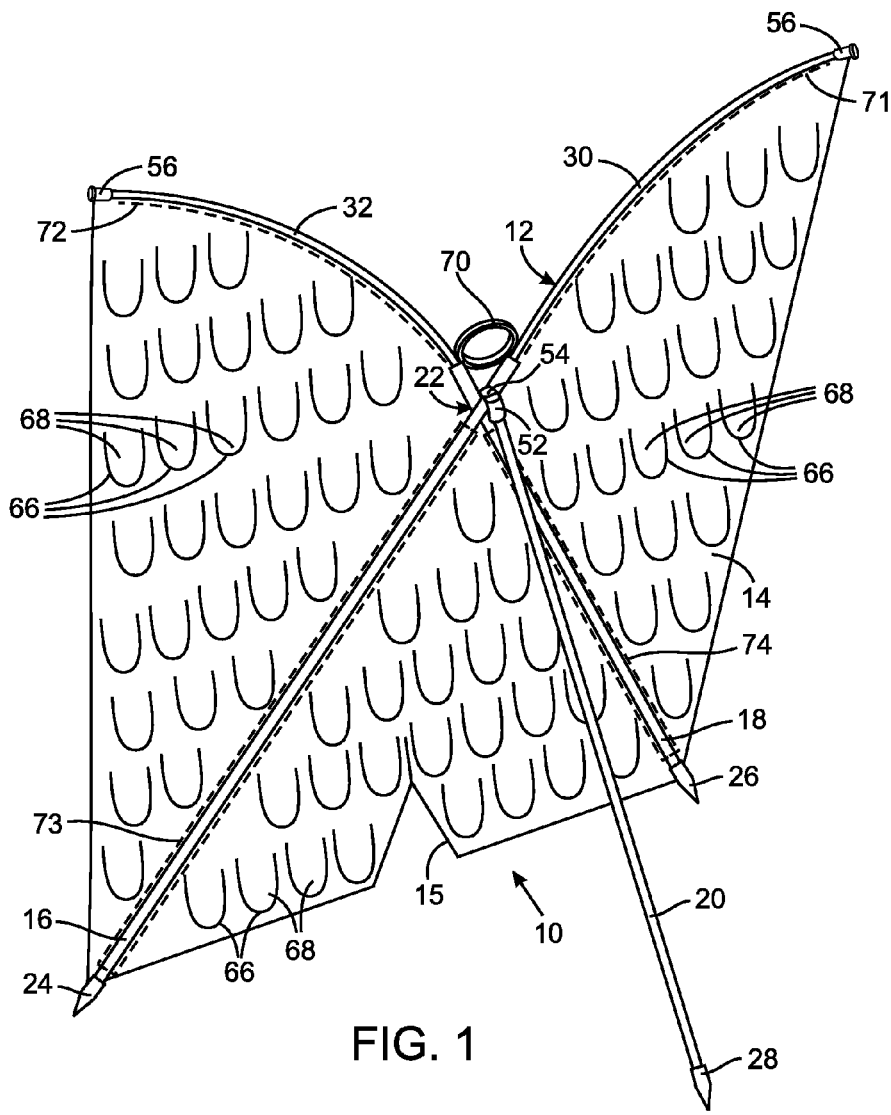
FIG. 1 is a perspective view of a hunting blind, according to the present invention, that is in the erected state.

With initial reference to FIG. 1, a hunting blind 10, according to the present invention, comprises a frame 12 that supports a sheet 14 of material. The sheet 14 is illustrated as though it is transparent so that the components of the frame 12 are visible, however, in practice the sheet typically is opaque. The frame 12 comprises two tubular support poles 16 and 18 and two rods 30 and 32. A first rod 30 telescopes into and out of the upper end of the first pole 16 and is illustrated in the fully extended position. A second rod 32 of the frame 12 telescopes into and out of the second pole 18 and also is illustrated in the fully extended position. A brace pole 20 has an upper end that is joined to the upper ends of the first and second support poles 16 and 18 by a connector 22. They assembly of the support poles 16 and 18 and the brace pole 20 for a tripod so that the hunting blind 10 is self supporting. The lower ends of the poles 16, 18, and 20 have stake caps 24, 26, and 28, respectively, secured thereto for embedding the poles into the ground to secure the hunting blind 10 in place. A separate end cap 56 is secured to the distal ends of the rods 30 and 32. In some instances, the erected hunting blind 10 is carried in front of the hunter as he/she moves in pursuit of the game. In those instances, the brace pole 20 may be removed from the connector 22 to facilitate carrying the erected hunting blind as a shield.

The poles and rods 16, 18, 20, 30 and 32 are formed of a material, such as fiberglass, metal, wood, or plastic. The connector 22 may be made of a thermoplastic elastomer (TPE), which is a rubber-like copolymer material, that has a high degree of flexibility and resiliency. The stake caps 24, 26, and 28 and end caps 56 are nylon, but may be made of other materials.

FIG. 1 shows the rear surface of the sheet 14. The sheet may comprise any of several types of material, such a woven fabric, plastic, or a mesh material. For example, a fabric having a conventional camouflage pattern imprinted on the front surface can be employed. As shown in FIG. 1, the sheet 14 may be die cut with a pattern of slits 66 a variety of shapes that form a plurality of flaps 68. For example, the slits may be in the U-shaped to form flaps that resemble leaves. The flaps 68 can move in a windy environment to further blend the hunting blind into surrounding vegetation.

Figure 2:
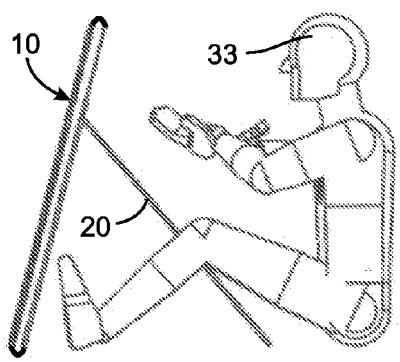
FIG. 2 is a schematic illustration of a hunter concealed behind the blind.

A hunter 33 sits behind the erected hunting blind 10, as shown in FIG. 2.

FIGS. 3 and 4 depict the details of one form of the connector 22 for the frame 12. The connector 22 has a pair of tubular receptors 34 and 36 spaced apart by a cross member 38 that is spaced from, but proximate to, the lower end of each of the receptors 34 and 36. The first support pole 16 is tightly received in a closed first aperture 40 forming a first bore and extending inward from the lower end of the first receptor 34 for substantially the entire length of the first receptor. A smaller diameter second aperture 42 extends into the upper end of the first receptor 34, opening into the larger diameter first aperture 40. The first rod 30 extends freely through the second aperture 42 and into the lumen 49 of the first support pole 16. The second support pole 18 is tightly received in a closed third aperture 44 forming a second bore and extending inward from the lower end of the second receptor 36 for substantially the entire length of the second receptor. A smaller diameter fourth aperture 46 extends into the upper end of the second receptor 36, opening into the larger diameter third aperture 44. The second rod 32 extends freely through the fourth aperture 46 and into the lumen 50 of the second support pole 18. The resilient nature of the material that forms the connector 22 secures the support poles 16 and 18 within the respective apertures 40 and 44. The two rods 30 and 32 can slide through the second and fourth apertures 42 and 46 and the pole lumens 49 and 50, so as to telescope from the connector 22 and the respective support poles. The first and second rods 30 and 32 may have an annular protuberance 48 near the end within the first and second support poles 16 and 18. When a rod 30 or 32 is in the fully extended position as illustrated, the larger diameter of the protuberance 48 prevents the rod from retracting into the respective support pole 16 or 18. The resiliency of the tubular receptors 34 and 36 allows the protuberance 48 to pass through the respective second and fourth apertures 42 and 46 when forced by the hunter to collapse the hunting blind 10. It should be appreciated that other forms of a connector 22 may be employed.

In the orientation of the connector 22 in FIG. 4, a brace receptor 52 projects upward from the cross member 38 between the two pole receptors 34 and 36. A relatively thin connector strip 54 attaches the lower end of the brace receptor 52 to the cross member 38. The brace pole 20 has an end that is received within a fifth aperture 47 that forms a third bore in the brace receptor 52.

Figure 7:
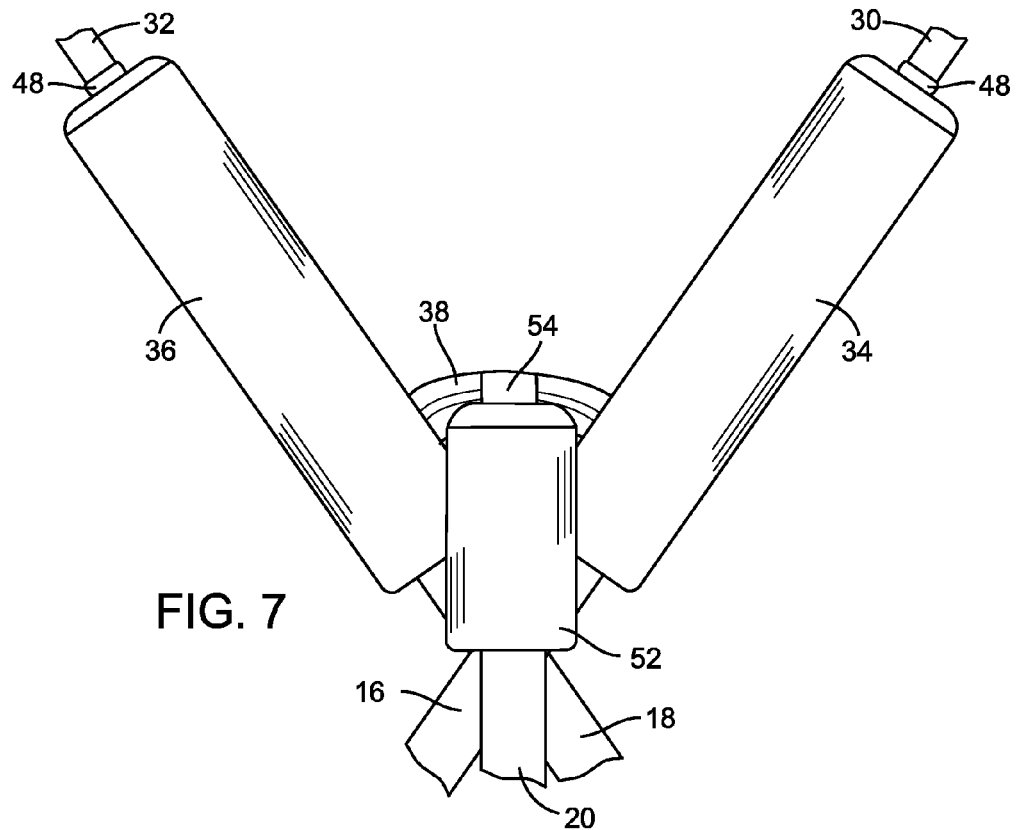
FIG. 7 is a front view of the connector in an expanded state of the hunting blind.
Figure 8:
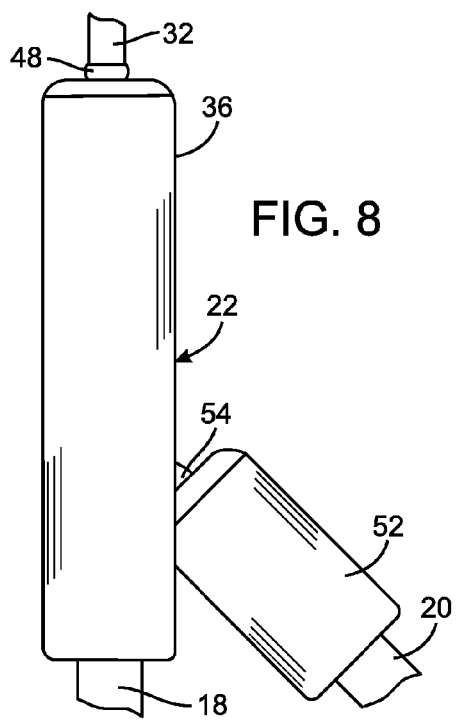
FIG. 8 is a side view of the connector in the hunting blind expanded state.

The cross member 38 and connector strip 54 are flexible structures that allow the three receptors 34, 36, and 52 to pivot with respect to each other. Specifically with reference to FIGS. 1, 7 and 8, when the hunting blind 10 is erected and the support poles 18 and 16 are spread apart into an expanded state, the support poles cross each other beneath the connector 22 and the upper ends of each of the pole receptors 34 and 36 pivot outward. The brace pole 20 is pivoted downward approximately 120 degrees from the upward position as illustrated in FIG. 4 into the expanded state shown in FIG. 1 in which the stake cap 28 of the brace pole engages the ground. As noted previously, the relative thin structure of the cross member 38 and the connector strip 54, as well as the flexible and resilient material used for the connector, allows this pivoting action to occur.

Referring again to FIG. 1, the sheet 14 is attached to the frame 12. The term "sheet" as used herein includes single piece of material, multiple pieces attached together, and multiple pieces of material attached to the frame 12 in a manner wherein they function similar to a single piece to conceal the hunter. The side and bottom edges of the sheet may be hemmed. The bottom edge may have a pleat 15 to allow the hunter to extend his or her legs under the hunting blind when seated there behind. The upper border of the sheet 14 has a V-shape that conforms to the curvature of the rods 30 and 32. This provides a notch through which the hunter can place a rifle, resting the barrel on top of the connector 22. An optional loop 70 may be attached to the sheet 14 in the notch allowing the rifle barrel to be inserted through the loop so that the hunting blind 10 can be carrier as a shield while the hunter walks. The upper edges of the sheet 14 have sleeves 71 and 72, commonly called "casings" in sewing terminology, through which the rods 30 and 32 loosely extend to attached the sheet to the frame 12. The outer upper corners of the sheet 14 are further secured to the rods 30 and 32 by a separate end cap 56, which is shown in detail in FIG. 5. The end cap 56 has a tubular body 57 with a lumen 59 and a longitudinal groove 58 extending through the tubular body. An enlarged head 55 is at one end of the tubular body 57.

To attach the sheet 14 to the rods 30 and 32 during manufacture of the hunting blind 10, the sheet is pulled tightly around the outer end of the rod and that end and the sheet are pressed into the lumen of the end cap 56 with the adjacent portion of the sheet 14 extending through the longitudinal groove 58. In the erected, expanded state as shown in FIG. 1, the flexible nature causes each rod 30 and 32 acts as a spring which maintains the fabric sheet 14 taut on the frame 12.

Strips of the sheet material are attached, such as by sewing, diagonally across the rear surface of the sheet 14 to form additional sleeves 73 and 74 through which the support poles 16 and 18 extend to fasten the sheet to the frame 12. The two stake caps 24 and 26 are identical and have the configuration as shown in FIG. 6. Each stake cap has tubular portion 60 with a lumen 61 within which the lower end of a support pole 16 or 18 is received. The stake caps 24 and 26 also secure the sheet 14 to the support poles 16 and 18 in a manner similar to that by which the end caps 56 fasten the sheet to the rods 30 and 32. When attached to the support poles, the sheet passes through a longitudinal groove 62 in the stake cap. The stake cap 28 for the brace pole 20 has a similar construction as shown in FIG. 6, but does not have the longitudinal groove 62 as fabric does not extend around the brace pole. The stake caps 24, 26 and 28 have conical tips 63 for embedding into the ground to hold the hunting blind 10 in place when erected.

Referring again to FIG. 1, to erect the hunting blind 10 the support poles 18 and 16 are spread apart into an expanded state in which those poles cross each other beneath the connector 22 and causing the upper ends of the pole receptors 34 and 36 to pivot outward. The rods 30 and 32 then are extended by sliding them outward from the upper ends of the support poles 18 and 16. If the distal ends of the rods 30 and 32 were not attached to the sheet 14 by the end caps 56, the rods would extend straight outward from the support poles to a greater height than that shown in FIG. 1. Because the heights of the right and lift sides of the sheet 14 are less than that greater height of the rod ends, attachment to the sheet causes the rods 30 and 32 flex into the curved shape illustrated. The resiliency of the rods 30 and 32 holds the sheet in a taut state, stretched across the frame 12.

The brace pole 20 then is pivoted outward and the stake caps 28 placed onto or into the ground. The amount that the poles 16, 18, and 20 are spread apart adjusts the overall height and width of the hunting blind 10. It should also be noted that one of both of the rods 30 and 32 may remain slid fully or partially into the tubular support poles 16 and 18 to vary the size of the hunting blind 10. Multiple hunting blinds may be placed side by side to create a larger concealment area.

To collapse the hunting blind 10, each of the rods 30 and 32 is pushed into the connector 22 and the respective support pole 16 and 18. This causes the sleeves 71 and 72 around the rods to pucker, thereby no longer holding the fabric taut. After the rods 30 and 32 have been fully retracted into the support poles 16 and 18, the poles can be pivoted together in a parallel with the brace pole 20. The loose fabric sheet 14 can be gathered against or wrapped around the three poles to provide a compact configuration that can be easily carried by the hunter. A tie strap, with a hook and loop fastening mechanism, for example, can be used to secure the hunting blind 10 compactly in the collapsed state. A reverse process is used to open the hunting blind 10 into the expanded state.

Figure 9:
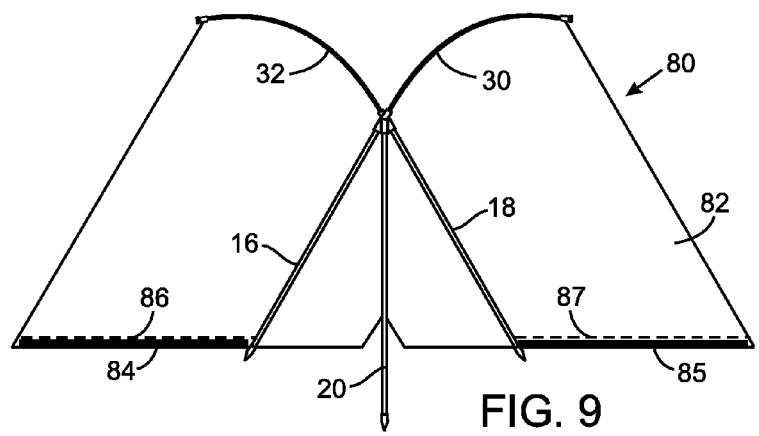
FIG. 9 shows a second hunting blind according to the present invention.

FIG. 9 illustrates a second hunting blind 80 similar to the one in FIG. 1, except that the sheet 82 extends laterally outward beyond the lower ends of the support poles 16 and 18, thereby forming wings of the hunting blind. Separate bottom poles 84 and 85 is received within a sleeve 86 and 87, respectively, along the bottom edge of each wing of the sheet 82. The weight of the bottom poles 84 and 85 holds the bottom edges of the sheet wings against the ground when the second hunting blind is erected. The second hunting blind 80 is wider than the first hunting blind 10, providing greater concealment of the hunter.

Figure 10:
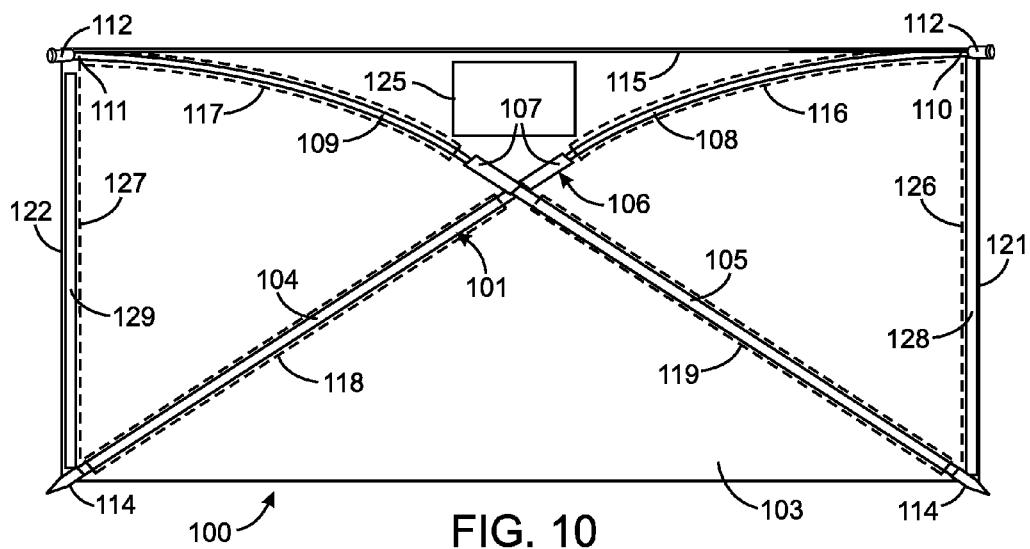
FIG. 10 is a side view of a third hunting blind in the shape of a tent formed by a pair of the hunting blind frames shown in FIG. 1.
Figure 11:
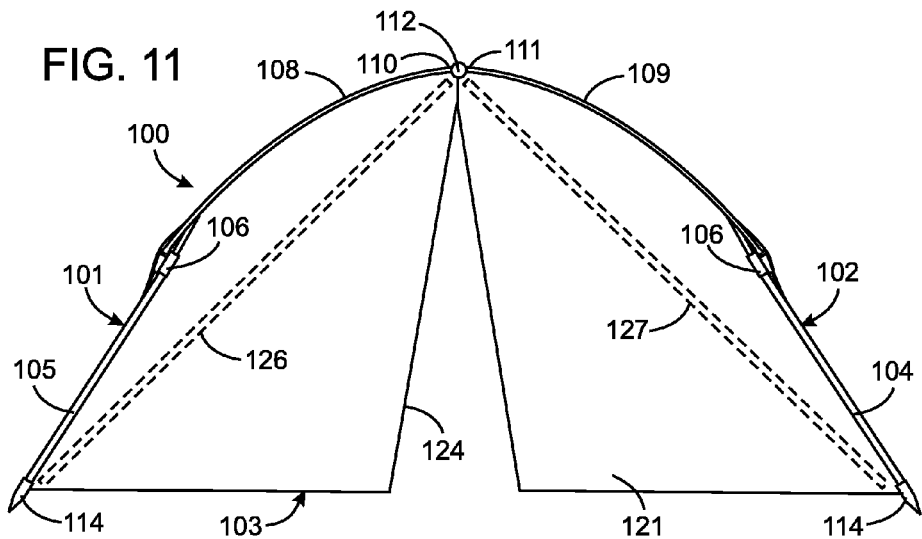
FIG. 11 is an end view of the tent.

With reference to FIGS. 10 and 11, a third hunting blind 100, having a tent like configuration, can be constructed using two frames similar to those of the hunting blind 10 in FIG. 1. Specifically, a sheet 103 formed of a material, such a woven fabric, plastic, or a mesh material extends over and is supported by first and second frames 101 and 102 as shown in an end view of the third hunting blind 100 depicted in FIG. 11. The other end may look the same or it may not have an opening slit 124. FIG. 10 illustrates one side of the third hunting blind 100 with the opposite appearing the same. The sheet 103 is illustrated as though it is transparent so that the components of the frames are visible, however, in practice the sheet typically is opaque.

Each of the first and second frames 101 and 102 has first and second support poles 104 and 105 with upper ends coupled by a connector 106. The connector 106 is similar to the previously described connector 22, except that it does not have the third receptor 52 as a brace pole is not employed in the third hunting blind 100. The support poles 104 and 105 are received in the lower ends of the two receptors 107 of the connector 106. Each frame 101 and 102 further includes first and second rods 108 and 109 which slide within the lumens of the first and second support poles 104 and 105, respectively. The first and second rods 108 and 109 project through apertures in the upper ends of the receptors 107 of each connector 106. The rods can be extended from and retracted into the respective support poles in the same manner as previously described with respect to the components of the frame in the first hunting blind 10.

With particular reference to FIG. 11, the two frames 101 and 102 are coupled together at the distal ends 110 and 111 of the rods 108 and 109. Specifically, the distal end 110 of the first support rod 108 of the first frame 101 is coupled to the distal end 111 of the second rod 109 of the second frame 102. That coupling can be accomplished in a number of manners. For example, a single end cap 112 may have two apertures within which the distal ends of the respective rods are received. Alternatively, separate single aperture end caps such as shown in FIG. 5 can be used with the fabric of the sheet 103 being held within each of the end caps and providing that coupling of the two adjacent rods.

End caps 112 at the distal ends of each rod 108 and 109 and stake caps 114 at the bottom ends of every one of the support poles 104 and 105 attach the sheet 103 to both frames 101 and 102 in the same manner as with the first hunting blind 10. A string, wire or similar element 115 is strung between the two end caps 112 to provide support so that the middle of the sheet 103 does not sag when the third hunting blind is erected. The left and right sides of the sheet 103, in the orientation of the third hunting blind 100 shown in FIG. 11, have four sleeves to receive components of the first and second frames 101 and 102. For example, on the left side shown in FIG. 10, the sheet 103 has first and second sleeves 116 and 117 sewn thereto and within which the first and second rods 108 and 109 are respectively received. Third and fourth sleeves 118 and 119 are also sewn to each side of the sheet 103 to receive the support poles 104 and 105. The sleeves aid in attaching the sheet 103 to the frames 101 and 102.

In addition to the sheet 103 stretching across each of the frames 101 and 102, the sheet has end panels 121 and 122 that extend across the opposite ends of the third hunting blind 100. As shown in FIG. 11, one or both of these end panels, 121 and 122 may have a slit 124 that forms an opening of the third hunting blind. A hunter concealed within the third hunting blind 100 can view game and shoot a weapon through that opening 124. In addition, a window opening 125 may be provided in one or both of the sides and also in the end panels 121 and 122 (not shown). Each end panel 121 and 122 has a pair of reinforcing straps 126 and 127 attached, such as by sewing, diagonally from an outer lower corner to a point adjacent the end cap 112.

The third hunting blind 100 can be collapsed into a compact state for transport by retracting all the rods 108 and 109 into the support poles 104 and 105 of the frames 101 and 102. Then all the support poles 104 and 104 are placed adjacent each other in a parallel manner and the sheet 103 is gathered against or wrapped around that assembly of poles to form a compact configuration of the third hunting blind.

The third hunting blind 100 can be erected from the collapsed state by spreading the lower ends of the support poles 104 and 105 apart to form the X configuration shown in FIG. 10. Then the rods 108 and 109 are extended from the support poles stretching the sheet 103 across the first and second frames 101 and 102.

The foregoing description was primarily directed to one or more embodiments of the invention. Although some attention has been given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A hunting blind comprising:
   first and second support poles, each being tubular with a lumen;
   a first connector attached to the first and second support poles in a manner that enables the first and second support poles to pivot with respect to each other;
   a first rod slideably received within the lumen of the first support pole and having a first distal end projecting from the first support pole;
   a second rod slideably received within the lumen of the second support pole and having a second distal end projecting from the second support pole;
   a sheet defining a first sleeve arranged to receive and substantially conceal the first rod, and a second sleeve arranged to receive and substantially conceal the second rod;
   a first sheet connector holding the sheet against the first support pole;
   a second sheet connector holding the sheet against the second support pole;
   a third sheet connector holding the sheet against the first rod; and
   a fourth sheet connector holding the sheet against the second rod,
   wherein the third sheet connector comprises a first end cap securing the sheet to an end of the first rod; and the fourth sheet connector comprises a second end cap securing the sheet to an end of the second rod.

2. The hunting blind as recited in claim 1 wherein the first connector comprises a first receptor engaging the first support pole and first rod, and a second receptor engaging the second support pole and second rod, the first connector including a flexible cross member connected to the first and second receptors and enabling those receptors to pivot with respect to each other.

3. The hunting blind as recited in claim 2 wherein the first receptor has a first aperture into which the first support pole is received and a second aperture into which the first rod is received; and the second receptor has a third aperture into which the second support pole is received and a fourth aperture into which the second rod is received.

4. The hunting blind as recited in claim 1 further comprising a brace pole attached to the first connector in a manner that enables the first and second support poles and the brace pole to pivot with respect to each other.

5. The hunting blind as recited in claim 4 wherein the first connector comprises a first receptor engaging the first support pole and first rod, a second receptor engaging the second support pole and second rod, and a third receptor engaging the brace pole, the first connector including a flexible cross member connected to the first, second and third receptors and enabling those receptors to pivot with respect to each other.

6. The hunting blind as recited in claim 5 wherein the first receptor has a first aperture into which the first support pole is received and a second aperture into which the first rod is received; the second receptor has a third aperture into which the second support pole is received and a fourth aperture into which the second rod is received; and the third receptor has a fifth aperture into which the brace pole is received.

7. The hunting blind as recited in claim 5 wherein the third receptor is connected to the flexible cross member by a flexible connector strip.

8. The hunting blind as recited in claim 1 wherein the sheet has first and second sleeves within which the first and second rods are received.

9. The hunting blind as recited in claim 1 wherein the sheet has one sleeve within which the first support pole is received, and another sleeve within which the second support pole is received.

10. The hunting blind as recited in claim 1 wherein the sheet has a plurality of slits which form a plurality of flaps.

11. The hunting blind as recited in claim 1 wherein the first sheet connector comprises a first stake cap securing the sheet to an end of the first support pole; and the second sheet connector comprises a second stake cap securing the sheet to an end of the second support pole.

12. The hunting blind as recited in claim 11 wherein each of the first and second stake caps has a conical tip.

13. The hunting blind as recited in claim 1 further comprising:
   third and fourth support poles, each being tubular with a lumen;
   a second connector attached to the third and fourth support poles in a manner that enables the third and fourth support poles to pivot with respect to each other;
   a third rod slideably received within the lumen of the third support pole and having a third distal end projecting from the third support pole; and
   a fourth rod slideably received within the lumen of the fourth support pole and having a fourth distal end projecting from the fourth support pole;
   wherein the sheet is coupled to each of the third and fourth support poles and the third and fourth rods.

14. The hunting blind as recited in claim 13 wherein the sheet has a plurality of sleeves within which the third and fourth support poles and the third and fourth rods are received.

15. The hunting blind as recited in claim 13 further comprising:
   one end cap securing the sheet to an end of the third rod;
   another end cap securing the sheet to an end of the fourth rod;
   one stake cap securing the sheet to an end of the third support pole; and
   another stake cap securing the sheet to an end of the fourth support pole.

16. The hunting blind as recited in claim 13 wherein the third rod telescopes within the third support pole and a fourth rod telescopes within the fourth support pole.

17. The hunting blind as recited in claim 13 further comprising:
   a fifth sheet connector holding the sheet against the third support pole;
   a sixth sheet connector holding the sheet against the fourth support pole;
   a seventh sheet connector holding the sheet against the third rod; and
   an eighth sheet connector holding the sheet against the fourth rod.

18. The hunting blind as recited in claim 1 wherein the first rod telescopes within the first support pole and the second rod telescopes within the second support pole.

19. A hunting blind comprising:
   first and second support poles;
   a brace pole;
   first and second rods;
   a connector comprising a first receptor for engaging the first support pole and the first rod, a second receptor for engaging the second support pole and the second rod, and a third receptor for engaging the brace pole, the connector including a flexible cross member connected to the first, second and third receptors and enabling those receptors to pivot with respect to each other;

a sheet;

a first sheet connector fastening the sheet to the first support pole;

a second sheet connector fastening the sheet to the second support pole;

a third sheet connector fastening the sheet to the first rod; and a fourth sheet connector fastening the sheet to the second rod, wherein the third sheet connector comprises a first end cap securing the sheet to an end of the first rod, and the fourth sheet connector comprises a second end cap securing the sheet to an end of the second rod.

20. The hunting blind as recited in claim 19 wherein the first receptor has a first aperture into which the first support pole is received and a second aperture into which the first rod is received;

the second receptor has a third aperture into which the second support pole is received and a fourth aperture into which the second rod is received; and the third receptor has a fifth aperture into which the brace pole is received.

21. The hunting blind as recited in claim 19 wherein the first receptor has a first bore into which the first support pole and the first rod are received;

the second receptor has a second bore into which the second support pole and the second rod are received; and the third receptor has a third bore into which the brace pole is received.

22. The hunting blind as recited in claim 19 wherein the third receptor is connected to the flexible cross member by a flexible connector strip.

23. The hunting blind as recited in claim 19 wherein the sheet has first and second sleeves within which the first and second rods are received.

24. The hunting blind as recited in claim 19 wherein the sheet has one sleeve within which the first support pole is received, and another sleeve within which the second support pole is received.

25. The hunting blind as recited in claim 19 wherein the first sheet connector comprises a first stake cap securing the sheet to an end of the first support pole; and the second sheet connector comprises a second stake cap securing the sheet to an end of the second support pole.

26. The hunting blind as recited in claim 19 wherein the first rod telescopes within the first support pole and the second rod telescopes within the second support pole.

27. The hunting blind as recited in claim 19 wherein:

the first sheet connector holds the sheet against the first support pole;

the second sheet connector holds the sheet against the second support pole;

the third sheet connector holds the sheet against the first rod; and a fourth sheet connector holds the sheet against the second rod.

28. A hunting blind comprising:

first and second support poles, each being tubular with a lumen;

a first connector attached to the first and second support poles in a manner that enables the first and second support poles to pivot with respect to each other;

a first rod slideably received within the lumen of the first support pole and having a first distal end projecting from the first support pole;

a second rod slideably received within the lumen of the second support pole and having a second distal end projecting from the second support pole;

a sheet defining a first sleeve arranged to receive and substantially conceal the first rod, and a second sleeve arranged to receive and substantially conceal the second rod;

a first sheet connector holding the sheet against the first support pole;

a second sheet connector holding the sheet against the second support pole;

a third sheet connector holding the sheet against the first rod; and a fourth sheet connector holding the sheet against the second rod, wherein the first sheet connector comprises a first stake cap securing the sheet to an end of the first support pole, and the second sheet connector comprises a second stake cap securing the sheet to an end of the second support pole.

29. The hunting blind as recited in claim 28 wherein the first connector comprises a first receptor engaging the first support pole and first rod, and a second receptor engaging the second support pole and second rod, the first connector including a flexible cross member connected to the first and second receptors and enabling those receptors to pivot with respect to each other.

30. The hunting blind as recited in claim 29 wherein the first receptor has a first aperture into which the first support pole is received and a second aperture into which the first rod is received; and the second receptor has a third aperture into which the second support pole is received and a fourth aperture into which the second rod is received.

31. The hunting blind as recited in claim 28 further comprising a brace pole attached to the first connector in a manner that enables the first and second support poles and the brace pole to pivot with respect to each other.

32. The hunting blind as recited in claim 31 wherein the first connector comprises a first receptor engaging the first support pole and first rod, a second receptor engaging the second support pole and second rod, and a third receptor engaging the brace pole, the first connector including a flexible cross member connected to the first, second and third receptors and enabling those receptors to pivot with respect to each other.

33. The hunting blind as recited in claim 32 wherein the first receptor has a first aperture into which the first support pole is received and a second aperture into which the first rod is received; the second receptor has a third aperture into which the second support pole is received and a fourth aperture into which the second rod is received; and the third receptor has a fifth aperture into which the brace pole is received.

34. The hunting blind as recited in claim 32 wherein the third receptor is connected to the flexible cross member by a flexible connector strip.

35. The hunting blind as recited in claim 28 wherein the sheet has first and second sleeves within which the first and second rods are received.

36. The hunting blind as recited in claim 28 wherein the sheet has one sleeve within which the first support pole is received, and another sleeve within which the second support pole is received.

37. The hunting blind as recited in claim 28 wherein the sheet has a plurality of slits which form a plurality of flaps.

38. The hunting blind as recited in claim 28 wherein each of the first and second stake caps has a conical tip.

39. The hunting blind as recited in claim 28 further comprising:
third and fourth support poles, each being tubular with a lumen;
a second connector attached to the third and fourth support poles in a manner that enables the third and fourth support poles to pivot with respect to each other;
a third rod slideably received within the lumen of the third support pole and having a third distal end projecting from the third support pole; and
a fourth rod slideably received within the lumen of the fourth support pole and having a fourth distal end projecting from the fourth support pole;
wherein the sheet is coupled to each of the third and fourth support poles and the third and fourth rods.

40. The hunting blind as recited in claim 39 wherein the sheet has a plurality of sleeves within which the third and fourth support poles and the third and fourth rods are received.

41. The hunting blind as recited in claim 39 further comprising:
one end cap securing the sheet to an end of the third rod;
another end cap securing the sheet to an end of the fourth rod;
one stake cap securing the sheet to an end of the third support pole; and
another stake cap securing the sheet to an end of the fourth support pole.

42. The hunting blind as recited in claim 39 wherein the third rod telescopes within the third support pole and a fourth rod telescopes within the fourth support pole.

43. The hunting blind as recited in claim 39 further comprising:
a fifth sheet connector holding the sheet against the third support pole;
a sixth sheet connector holding the sheet against the fourth support pole;
a seventh sheet connector holding the sheet against the third rod; and
an eighth sheet connector holding the sheet against the fourth rod.

44. A hunting blind comprising:
first and second support poles;
a brace pole;
first and second rods;
a connector comprising a first receptor for engaging the first support pole and the first rod, a second receptor for engaging the second support pole and the second rod, and a third receptor for engaging the brace pole, the connector including a flexible cross member connected to the first, second and third receptors and enabling those receptors to pivot with respect to each other;
a sheet;
a first sheet connector fastening the sheet to the first support pole;
a second sheet connector fastening the sheet to the second support pole;
a third sheet connector fastening the sheet to the first rod; and
a fourth sheet connector fastening the sheet to the second rod,
wherein the first sheet connector comprises a first stake cap securing the sheet to an end of the first support pole, and the second sheet connector comprises a second stake cap securing the sheet to an end of the second support pole.

45. The hunting blind as recited in claim 44 wherein the first receptor has a first aperture into which the first support pole is received and a second aperture into which the first rod is received; the second receptor has a third aperture into which the second support pole is received and a fourth aperture into which the second rod is received; and the third receptor has a fifth aperture into which the brace pole is received.

46. The hunting blind as recited in claim 44 wherein the first receptor has a first bore into which the first support pole and the first rod are received; the second receptor has a second bore into which the second support pole and the second rod are received; and the third receptor has a third bore into which the brace pole is received.

47. The hunting blind as recited in claim 44 wherein the third receptor is connected to the flexible cross member by a flexible connector strip.

48. The hunting blind as recited in claim 44 wherein the sheet has first and second sleeves within which the first and second rods are received.

49. The hunting blind as recited in claim 44 wherein the sheet has one sleeve within which the first support pole is received, and another sleeve within which the second support pole is received.

50. The hunting blind as recited in claim 44 wherein the first rod telescopes within the first support pole and the second rod telescopes within the second support pole.

51. The hunting blind as recited in claim 44 wherein:
the first sheet connector holds the sheet against the first support pole;
the second sheet connector holds the sheet against the second support pole;
the third sheet connector holds the sheet against the first rod; and
a fourth sheet connector holds the sheet against the second rod.

* * * * *